United States Patent Office 3,044,577
Patented July 17, 1962

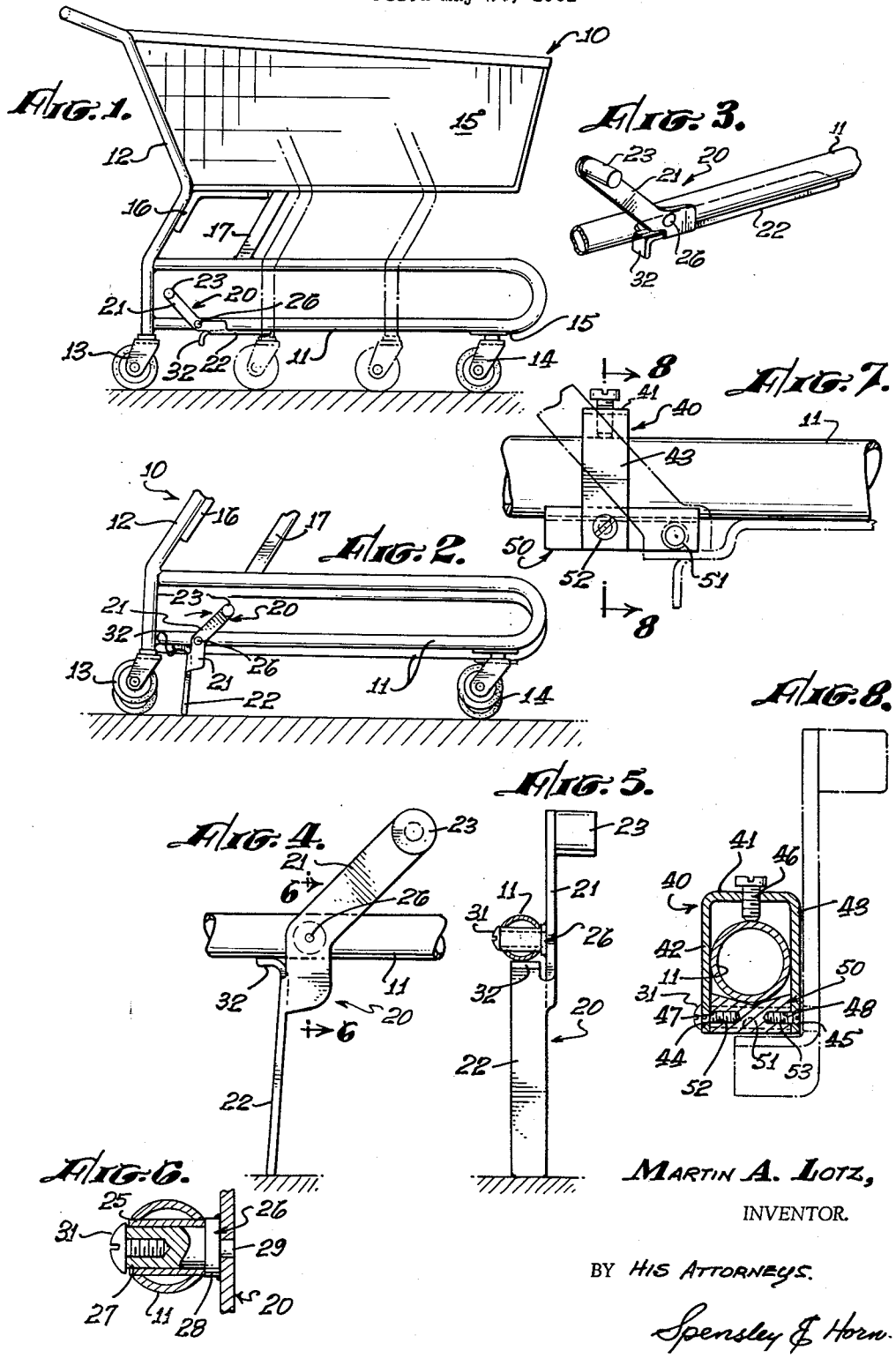

3,044,577
SHOPPING CART BRAKE
Martin A. Lotz, Culver City, Calif., assignor to The Concepts Co., Beverly Hills, Calif., a partnership
Filed May 24, 1961, Ser. No. 112,440
7 Claims. (Cl. 188—5)

This invention pertains to the provision of brake mechanisms for handcarts and more particularly to a brake stand mechanism for market shopping carts.

It is common practice today for supermarkets to provide shopping carts for the convenience of customers in carrying their groceries from the checkout stand to their automobiles. The carts are usually designed so that they can be run together in nested arrangement for convenience of storage while awaiting use. Normally these carts have swivel-mounted wheels but have no brake to prevent the cart from rolling on sloping terrain.

Accordingly, it is an object of the present invention to provide a brake mechanism for shopping carts.

It is another object of the present invention to provide a brake mechanism for shopping carts capable of being run together in nested arrangement, the brake mechanism providing no obstruction to the nesting of the carts.

It is still another object of the present invention to provide a simple brake mechanism easily attachable to shopping carts.

It is a further object of the present invention to provide an easily operable brake mechanism for shopping carts.

It is a yet further object of the present invention to provide a foot operated brake mechanism for shopping carts.

It is also an object of the present invention to provide a brake mechanism for shopping carts, which brake mechanism serves to lift one or more wheels of the cart from the ground.

The objects of the present invention are accomplished, in the presently preferred embodiment, by a brake mechanism comprising a rocker arm pivotally mounted to a lower generally horizontal support member of the shopping cart near a rear wheel. The rocker arm defines first and second elongate sections with the pivot point of the rocker arm in the first section and with the second section extending longitudinally away from one end of the first section. The other end of the second section is weighted sufficiently to establish the center of gravity of the rocker arm in the weighted end of its first section. The length of the second section is greater than the distance from the support member to a plane tangent to the lowermost surfaces of the cart wheels, so that when the second section is in a generally vertical position adjacent cart wheels will be lifted from the ground. The second section is laterally displaced from the first section so that the second section is substantially beneath the lower support member to limit rotation of the rocker arm between a stable rest position in which the second section is horizontally oriented and a braking position in which the second section is generally vertically oriented with one end in contact with the ground and with the other end sustaining the lower support member is a slightly elevated position.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 is an elevational view of a typical shopping cart including the brake mechanism of the present invention together with a phantom indication of how the shopping carts are assembled in nested arrangement;

FIGURE 2 is a partial elevational view of the shopping cart of FIGURE 1, showing the brake mechanism rotated to the braking position;

FIGURE 3 is a perspective view of a portion of the shopping cart of FIGURE 1, showing the brake mechanism in its rest position;

FIGURE 4 is a side view, in elevation, showing the brake mechanism in its braking position;

FIGURE 5 is an end view, in elevation, showing the brake mechanism in its braking position;

FIGURE 6 is a partial sectional view taken along the line 6—6 of FIGURE 4;

FIGURE 7 is a view, in elevation, of an alternative device for mounting the brake mechanism to a shopping cart; and FIGURE 8 is a sectional view taken along the line 8—8 of FIGURE 7.

Turning now to the drawing, in FIGURE 1 there is shown a shopping cart, generally indicated by the reference numeral 10, to which is mounted the brake mechanism of the present invention, generally indicated by the reference numeral 20. The cart structure embodies lower support members 11 of general U-shape and upright support members 12. Outwardly positioned rear wheels 13 are mounted to the bottom of the upright support members 12. The front wheels of the cart, in the form of casters 14, are mounted on a transverse plate 15 fixed to the underside of the lower support members 11. A basket 15 is mounted to the upright support members 12 and additionally supported on each side by an angle brace 16 and an incline support 17. The basket 15 is of the usual tapered form, as shown, and equipped with a hinged rear wall to permit upward swinging movement of the wall when the empty carts are moved together into nested association. The construction of such shopping carts is now well known in the art and hence will not be discussed in further detail. The brake mechanism 20 is mounted to the outermost edge of one of the support members 11 near a rear wheel 13 of the cart in order not to interfere with the nesting of similar carts. When the carts are in the nested arrangement, as indicated by the phantom views included in FIGURE 1, the brake mechanism 20 is behind the rear wheel of the immediately preceding cart. In the view of FIGURE 1, the brake mechanism 20 is shown in its "rest" position, while in the view of FIGURE 2 the brake mechanism 20 is shown in its "braking" position.

The brake mechanism 20 is shown in greater detail in FIGURES 3, 4 and 5. The brake mechanism is in the form of a rocker arm which is pivotally mounted to the lower support member 11 for rotation in a vertical plane. The rocker arm defines first and second elongate sections indicated by the respective reference numerals 21 and 22. In the illustrated embodiment the rocker arm is constructed of metal plate including a right angle bend separating the section 21 from the section 22. The section 21 forms an elongate member having an obtuse angle therein intermediate the ends thereof. The section 22 extends longitudinally away from one end portion of the section 21 and a weight 23 is fastened to the other end of the section 21. The weight 23 is cylindrically shaped and extends perpendicularly away from the rocker arm to provide an actuating pedal therefor, and is sufficiently heavy to establish the center of gravity of the rocker arm in the weighted end of the first section 21.

In FIGURES 1–5 the brake mechanism 20 is directly attached to the lower support member 11. FIGURE 6 shows in detail how the brake mechanism 20 is pivotally mounted to the lower support member 11. A tubular metallic sleeve 25 is inserted with a press fit into a horizontal transverse hole through the lower support member 11, each end of the sleeve slightly protruding beyond the diametric surface of the support member as shown. A pivot pin 26 is affixed to the section 21 of the brake mechanism at the vertex of the aforementioned obtuse angle therein, the pivot pin 26 being of a cylindrical configuration and defining three longitudinal sections having different diameters. The pivot pin 26 comprises an elongate end section 27, an intermediate section 28 and a short end section 29. The elongate end section 27 is of a diameter substantially equal to but slightly less than the inside diameter of the sleeve 25, the short end section 29 being of a reduced diameter and the intermediate section 28 being of a greater diameter to thereby form a peripheral collar. The short end section 29 of the pivot pin 26 is of a length approximately equal to the thickness of the metal plate of which the brake rocker arm is constructed. The short end section 29 is positioned in a hole extending through the section 21 of the brake rocker arm with a transverse surface of the intermediate section 28 in contact with the brake rocker arm and with the elongate end section 26 of the pivot pin extending perpendicularly away from the rocker arm. The pivot pin 26 is permanently affixed to the rocker arm in this relationship by a suitable fastening process such as brazing or welding, for example. The brake mechanism 20 is pivotally mounted to the support member 11 with the elongate end section 27 of the pivot pin 26 extending through the sleeve 25, the elongate end section of the pivot pin being retained within the sleeve by a transverse surface of the intermediate section 28 and by a round head screw 31 axially threaded into the elongate end section 27, the diameter of the screw head being slightly greater than the outer diameter of the sleeve 25. The length of the elongate end section 27 of the pivot pin 26 is only slightly greater than the length of the sleeve 25 to limit longitudinal play therebetween. Hence the elongate end section 27 of the pivot pin 26 forms a journal supported by the tubular bearing surface of the sleeve 25 for rotation of the brake rocker arm in a vertical plane.

One end of the section 22 of the rocker arm is bent at a 90 degree angle from the main portion of the section 22 to provide a support flange 32 extending away from the first section 21. The overall length of the section 22 is slightly greater than the perpendicular distance from the bottom of the lower support member 11 to a plane tangent to the lowermost surfaces of the cart wheels so that when the brake mechanism 20 is in the braking position, the section 22 of the rocker arm will lift the wheels on one side of the cart from the ground, as shown in FIGURE 2, with the support flange 32 of the section 22 in bearing contact with the bottom surface of the lower support member 11 and with the other end of the section 22 in contact with the ground.

Referring back to FIGURE 1 wherein the brake mechanism 20 is shown in its rest position, it is seen that in the rest position the second section 22 of the rocker arm is longitudinally in contact with the lower surface of the horizontal support member 11 of the shopping cart 10. The brake mechanism 20 is stable in the rest position due to the effect of the weight 23 which, in the rest position, tends to rotate the brake mechanism rocker arm in a counterclockwise direction. As indicated hereinabove, the brake mechanism is set to the rest position when the empty carts are to be assembled in a nested arrangement. When it is desired to utilize the brake mechanism to prevent a loaded cart from rolling, it is merely necessary for the user to place his foot against the weight 23 and urge the weight forward to a position on the other side of the pivot pin 26, and the weight of the weight 23 will then cause rotation of the brake mechanism rocker arm in a clockwise direction to bring the bottom of the section 22 into contact with the ground. A slight forward push of the cart will then continue rotation of the brake mechanism rocker arm to the braking position shown in FIGURE 2 wherein the wheels 13 and 14 on the side of the cart on which the brake mechanism 20 is mounted are lifted from the ground. Since the wheels are lifted only a slight amount from the ground, the cart remains perfectly stable and locked into position, the brake mechanism 20 providing both braking and supporting features. Hence, the brake mechanism 20 actually comprises a brake stand.

When it is desired to again move the shopping cart 10, a rearward pull of the cart will begin rotation of the brake mechanism rocker arm in a counterclockwise direction and allow the heretofore elevated wheels to again contact the ground. When the weight 23 rotates to a position rearward of the pivot pin 26, the weight will then exert a counterclockwise rotational force on the brake mechanism rocker arm to return the brake mechanism to the rest position shown in FIGURES 1 and 3.

Turning now to FIGURES 7 and 8 of the drawing there is shown an alternative structure for pivotally mounting the brake mechanism 20 to the lower support member 11, this alternative embodiment providing a more convenient means for modifying existing shopping carts to include the brake mechanism of the present invention. This alternative mounting device includes a yoke 40 and a support block 50. The yoke 40 is generally U-shaped, defining a channel section with a web 41 separating flanges 42 and 43. The flanges 42 and 43 are slightly longer than the outside diameter of the lower support member 11 so that the yoke may be placed over the support member with the member disposed between the flanges. The flange 42 has a countersunk screw hole 44 extending transversely through its free end. The flange 43 has a countersunk screw hole 45 extending transversely through tis free end, the screw holes 44 and 45 being in alignment perpendicular to the flanges 42 and 43. The web 41 has a threaded aperture 46 extending centrally therethrough as shown.

The support block 50 is constructed from a rectangular block of metal and has a longitudinal V-shaped groove in its upper surface. The width of the support block 50 is substantially equal to the spacing between the inner surfaces of the flanges 42 and 43 of the yoke 40 so that the block may be mounted therebetween. A circular passageway 51 extends transversely through the block 50 near one of its ends, the diameter of the passageway 51 being substantially equal to but slightly greater than the diameter of the elongate end section 27 of the pivot pin 26. A threaded aperture 52 is tapped transversely through the central portion of the block 50 to accommodate mounting screws for assemblage of the block 50 and the yoke 40. The brake mechanism 20 is pivotally mounted to the block 50 by insertion of the elongate end section 27 of the pivot pin 26 into the aperture 51 of the block 50, the pivot pin being there retained by the roundhead screw 31 with the brake mechanism 20 projecting toward the outside of the cart. For use with the embodiment of the mounting device shown in FIGURES 7 and 8, however, it is apparent that the length of the elongate end section 27 of the pivot pin 26 must be slightly greater than the distance between the outer surfaces of the flanges 42 and 43 of the yoke 40.

The mounting device of FIGURES 7 and 8 is assembled on a shopping cart 10 by placing the support block 50 in longitudinal alignment with the lower support member 11 and with the lower peripheral surface of the member 11 disposed within the V-shaped groove. The yoke 40 is placed astride the support member 11 and the block 50 with the screw holes 44 and 45 in the flanges 42 and 43 in alignment with the threaded aperture 52 through the block 50. A flat head screw 47 is inserted through the screw hole 44 in the flange 42 and threaded into one end of the aperture 52 in the block 50. A flat head screw 48 is inserted in the screw hole 45 in the flange 43 and threaded into the other end of the aperture 52. A pointed round head screw 47 is threaded through the aperture 46 in the web 41 of the yoke 40, the screw 47 being tightened until the pressure of the point of the screw against the upper surface of the horizontal support member 11 urges the surfaces of the V-shaped groove in the block 50 tightly against the lower peripheral surface of the support member 11 to thereby rigidly secure the mounting device to the shopping cart with the brake mechanism 20 properly oriented for rotation in a vertical plane. When the brake mechanism 20 is mounted on a shopping cart by means of the alternative mounting structure illustrated in FIGURES 7 and 8 the section 22 of the brake rocker arm may be bent to form a step as shown by the phantom lines in FIGURE 7 to allow the projecting end of the arm to lie flat against the lower surface of the support member 11 when the brake is in the rest position.

Although a weight has been shown in the illustrated embodiment to stably retain the brake mechanism in the rest position, it is apparent that other means, such as a clip or spring, are equally suitable. Furthermore, although a one-piece form of rocker arm construction was illustrated utilizing sheet material, other forms of construction utilizing a combination of rods or plates are suitable, as are the use of castings. For example, the rocker arm, pivot pin and weight could conveniently be cast from aluminum as an integral unit. Hence, although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. In a shopping cart having a generally horizontal support member proximate the cart wheels, a brake stand comprising a rocker arm pivotally mounted to said support member for rotation in a vertical plane, said rocker arm defining first and second elongate sections with the pivot point of said rocker arm being in said first section and with said second section extending longitudinally away from one end of said first elongate section, the length of said second elongate section being greater than the perpendicular distance from a plane tangent to the lowermost surfaces of said cart wheels to the lower surface of said support member adjacent said pivot point, said second section being laterally displaced from said first section so that said second section is substantially beneath said support member to thereby limit the rotation of said arm between a rest position in which said second elongate section is substantially horizontally oriented and a braking position in which said second elongate section is generally vertically oriented with one end extending below said plane tangent to the lowermost surfaces of said cart wheels and with the other end sustaining a portion of said support member in a slightly elevated position, said rocker arm being adapted for selective retention in said rest position.

2. In a shopping cart having a generally horizontal support member proximate the cart wheels, a brake stand comprising a rocker arm pivotally mounted to an edge of said horizontal support member proximate a cart wheel for rotation in a vertical plane, said rocker arm defining first and second elongate sections with the pivot point of said rocker arm being in said first section and with said second section extending longitudinally away from one end of said first elongate section, the length of said second elongate section being greater than the perpendicular distance from a plane tangent to the lowermost surfaces of said cart wheels to the lower surface of said support member adjacent said pivot point, said second section being laterally displaced from said first section so that said second section is substantially beneath said support member to thereby limit the rotation of said arm between a rest position in which said second elongate section is longitudinally in contact with said support member and a braking position in which said second elongate section is substantially vertically oriented with one end extending below said proximate cart wheel and the other end in bearing contact with the bottom surface of said support member, said rocker arm being adapted for selective retention in said rest position.

3. In a shopping cart having a generally horizontal support member proximate the cart wheels, a brake stand comprising a rocker arm pivotally mounted to an edge of said horizontal support member proximate a cart wheel for rotation in a vertical plane, said rocker arm defining first and second elongate sections with the pivot point of said rocker arm being in said first section and with said second section extending longitudinally away from one end of said first elongate section, the other end of said first elongate section being weighted with a weight sufficient to establish the center of gravity of said rocker arm in the weighted end of said first section, the length of said second elongate section being greater than the perpendicular distance from a plane tangent to the lowermost surface of said cart wheels to the lower surface of said support member adjacent said pivot point, said second section being laterally displaced from said first section so that said second section is substantially beneath said support member to thereby limit the rotation of said arm between a rest position in which said second eolngate section is longitudinally in contact with said support member and a braking position in which said second elongate section is substantially vertically oriented with one end extending below said proximate cart wheel and the other end in bearing contact with the bottom surface of said support member.

4. In a shopping cart having a generally horizontal support member proximate the cart wheels, a brake stand comprising a rocker arm pivotally mounted to an edge of said horizontal support member proximate a cart wheel for rotation in a vertical plane, said rocker arm defining first and second elongate sections with the pivot point of said rocker arm being in said first section and with said second section extending longitudinally away from one end of said first elongate section, the other end of said first elongate section being weighted with a weight sufficient to establish the center of gravity of said rocker arm in the weighted end of said first section, said second elongate section defining a substantially straight portion over the majority of its length, the longitudinal axis of said straight portion of said second elongate section being displaced from the center of gravity of said rocker arm, the length of said second elongate section being greater than the perpendicular distance from a plane tangent to the lowermost surfaces of said cart wheels to the lower surface of said support member adjacent said pivot point, said second section being laterally displaced from said first section so that said second section is substantially beneath said support member to thereby limit the rotation of said arm between a rest position in which said second elongate section is longitudinally in contact with said support member and a braking position in which said second elongate section is substantially vertically oriented with one end extending below said proximate cart wheel and the other end in bearing contact with the bottom surface of said support member.

5. In a shopping cart having a generally horizontal support member proximate the cart wheels, a brake stand comprising a rocker arm pivotally mounted to an edge of said horizontal support member proximate a rear wheel of the cart for rotation in a vertical plane, said rocker arm defining first and second elongate sections with the pivot point of said rocker arm being in said first section and with said second section extending longitudinally away from one end of said first elongate section, the other end of said first elongate section being weighted with a weight sufficient to establish the center of gravity of said rocker arm in the weighted end of said first section, said second section defining a substantially straight main body portion and a flanged end portion adjacent said first section, the longitudinal axis of said straight main body portion of said second elongate section being displaced from the center of gravity of said rocker arm, the length of said second elongate section being greater than the perpendicular distance from a plane tangent to the lowermost surfaces of said cart wheels to the lower surface of said support member adjacent said pivot point, said second section being laterally displaced from said first section so that said second section is substantially beneath said support member to thereby limit the rotation of said arm between a rest position in which said straight main body portion of said second elongate section is in longitudinal contact with said support member and a braking position in which said second elongate section is substantially vertically oriented with the end of the straight body portion extending below said proximate cart rear wheel and said flanged end in bearing contact with the bottom surface of said support member.

6. In a shopping cart having a generally horizontal support member proximate the cart wheels, a brake stand comprising a rocker arm pivotally mounted to an edge of said horizontal support member proximate a cart wheel for rotation in a vertical plane, said rocker arm being fabricated of metal plate and defining first and second elongate sections separated by a right angle bend, a pivot point of said rocker arm being in said first section and with said second section extending longitudinally away from one end of said first elongate section, the other end of said first elongate section being weighted with a weight sufficient to establish the center of gravity of said rocker arm in the weighted end of said first section, said second elongate section defining an elongate rectangular main body portion terminating at one end in a flange adjacent said first section, the length of said second elongate section being greater than the perpendicular distance from a plane tangent to the lowermost surfaces of said cart wheels to the lower surface of said support member adjacent to said pivot point, said second section being laterally displaced from said first section so that said second section is substantially beneath said support member to thereby limit the rotation of said arm between a rest position in which said main body portion of said second elongate section is in longitudinal contact with said support member and a braking position in which said second elongate section is substantially vertically oriented with one end of the straight body portion extending below said proximate cart wheel and the flanged end in bearing contact with the bottom surface of said support member.

7. A brake stand mechanism for attachment to a shopping cart having a generally horizontal cylindrical tubular support member proximate the cart wheels, said brake stand mechanism comprising: a generally rectangular support block having a longitudinal V-shaped groove extending the length of the upper surface thereof, the width of said support block being at least as great as the diameter of said cylindrical support member, said support block defining a circular cylindrical aperture extending transversely therethrough; a metallic yoke in the shape of a channel section defining a web separating flanges by a distance substantially equal to the width of said support block, said yoke being adapted for detachable mounting to the sides of said support block with said yoke astride said cylindrical support member and with the V-grooved upper surface of said support block longitudinally in contact with the lower peripheral surface of said support member, said yoke being adapted to rigidly secure the assemblage of said yoke and said support block to said support member with said cylindrical aperture extending through said support block being in horizontal alignment; and a rocker arm defining first and second elongate sections with a cylindrical pivot pin projecting from said first section in a direction longitudinally perpendicular thereto, the diameter of said pivot pin being substantially equal to but less than the diameter of said cylindrical aperture extending through said support block, said rocker arm being pivotally mounted to said support block by said pivot pin, said pivot pin being rotatably retained within said cylindrical aperture extending through said support block, the length of sad second elongate section of said rocker arm being greater than the distance from the lower surface of said support block to a plane tangent to the lowermost surfaces of said cart wheels when said brake mechanism is mounted to said support member of said shopping cart, said second section being laterally displaced from said first section so that said second section is substantially beneath said support block to thereby limit the rotation of said rocker arm between a rest position in which said second elongate section is substantially horizontally oriented and a braking position in which said second elongate section is generally vertically oriented with one end extending below said plane tangent to the lowermost surfaces of said cart wheels and with the other end in bearing contact with the bottom surface of said support block, said rocker arm being adapted for selective retention in said rest position.

References Cited in the file of this patent

UNITED STATES PATENTS

| | | |
|---|---|---|
| 158,436 | Plank | Jan. 5, 1875 |
| 257,512 | Overman | May 9, 1882 |
| 1,456,272 | Holder | May 22, 1923 |
| 2,219,686 | Germann | Oct. 29, 1940 |
| 2,958,537 | Young | Nov. 1, 1960 |